(No Model.)
W. R. McCALLUM.
ANT TRAP.
No. 358,212. Patented Feb. 22, 1887.
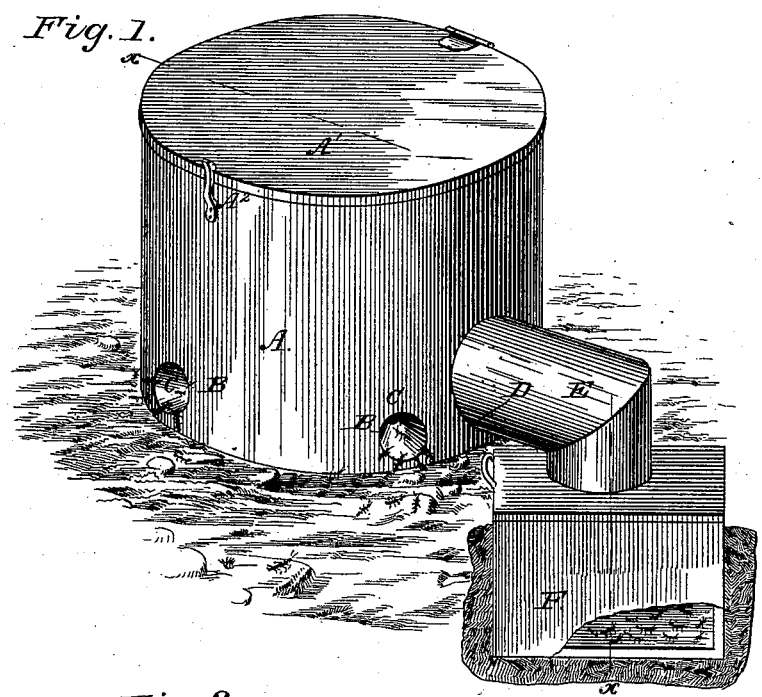
Fig. 1.
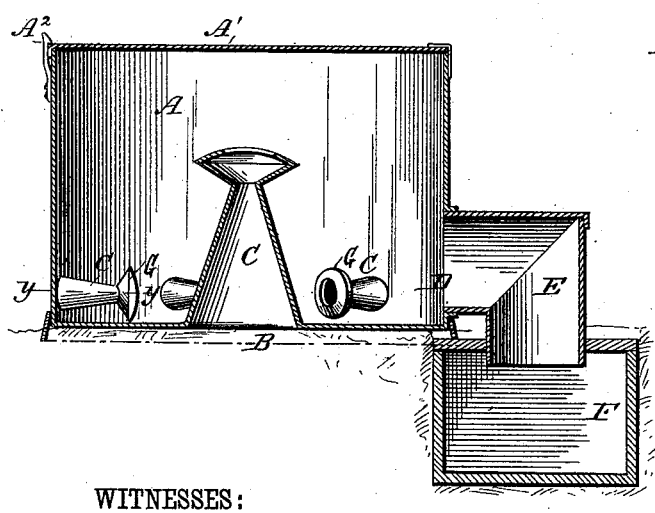
Fig. 2.
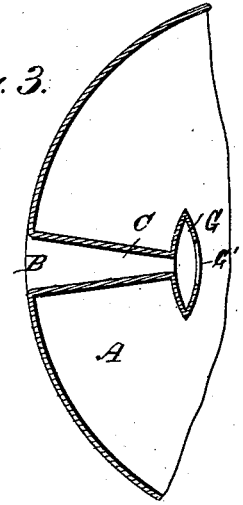
Fig. 3.
WITNESSES:
Fred G. Dieterich
Solon C. Kemon
INVENTOR:
W. R. McCallum
BY 
ATTORNEYS.

UNITED STATES PATENT OFFICE.

WALTER RANDOLPH McCALLUM, OF WAELDER, TEXAS.

ANT-TRAP.

SPECIFICATION forming part of Letters Patent No. 358,212, dated February 22, 1887.

Application filed June 19, 1886. Serial No. 205,687. (No model.)

*To all whom it may concern:*

Be it known that I, WALTER RANDOLPH McCALLUM, of Waelder, in the county of Gonzales and State of Texas, have invented a new and useful Improvement in Ant-Traps, of which the following is a description.

My invention consists in an ant trap or exterminator, which will be hereinafter fully described and claimed.

Referring to the accompanying drawings, Figure 1 is a perspective view of my ant-trap. Fig. 2 is a vertical sectional view of the same, taken on line $x$ $x$, Fig. 1; and Fig. 3 is a horizontal sectional view taken on the plane indicated by line $y$ $y$, Fig. 2.

The same letters of reference indicate corresponding parts in all the figures.

Referring to the several parts by letter, A represents the body of my improved ant-trap, which is here shown as circular in form with the flat top and bottom, but which may be made of any desired and suitable form. This body is provided with the hinged top A', which is held, when closed, by the spring-catch A²; or the top or cover may be used without hinges, if desired. In the bottom, which is preferably flat, and around the sides of this body portion are formed the apertures B, through which the ants obtain access into the trap, and these several apertures lead into conical tubes C, secured to the inner sides of the trap, surrounding the inlet-holes, with their smaller open inner ends projecting into the interior space of the trap, these tubes being much smaller at their inner ends than at their outer ends, so that although the ants may readily crawl through the tubes into the trap it will be impossible for them to escape therefrom. The tube at the central opening in the bottom of the trap has its open reduced upper end elevated high above the bottom of the trap, so as to effectually prevent the ants from escaping from it.

The bottom of the trap may have more than one tube, if desired. The inner ends of the tubes are protected against the entrance of insects in trying to escape by means of caps G, having apertures G'. These caps are each convex on their apertured sides, and the apertures are made larger than the openings in the ends of the tubes, so that should an ant succeed in getting into a cap from within the body A it would naturally enter the body again through the larger opening.

The trap may be formed at one side, near its bottom, with an outlet-opening, D, connected by a tube or spout, E, with a receiver, F, which latter may be a jar, box, or other vessel let into the ground or placed above the same. The trap may be connected by more than one tube with the receiver, if thought advisable.

The trap being placed in position upon the ground, the ants will enter the same through the conical tubes, and will not be able to escape through the same, and will then find their way through the tube E into the receiver F, in which they are collected, and may then be readily destroyed and the receiver removed and emptied when required; or, if desired, the receiver may be dispensed with and the trap used without it, in which case the captured ants can be removed from the trap by opening the hinged lid or top of the same.

From the foregoing description, taken in connection with the accompanying drawings, the construction and operation of my improved ant-trap will be readily understood.

The trap may be constructed of any suitable material.

Having thus described my invention, what I claim, and desire to secure by Letters Patent, is—

1. In an ant-trap, the combination, with the body having an aperture therein and a tube leading inward from said aperture, of the protecting-cap at the inner end of the tube and having a convex outer face provided with an aperture, substantially as set forth.

2. An ant-trap comprising the body A and the inward-projecting tubes C, having the protecting-caps G on their inner ends, the outer faces of the caps being convex and provided with apertures G', of greater diameter than the bore of the inner end of the tube, substantially as set forth.

WALTER RANDOLPH McCALLUM.

Witnesses:
W. J. FISHER,
J. R. WHITENTON.